United States Patent
Wang et al.

(10) Patent No.: US 9,693,329 B2
(45) Date of Patent: Jun. 27, 2017

(54) SYNCHRONIZATION METHOD OF USER EQUIPMENT AND USER EQUIPMENT

(71) Applicant: Huawei Technologies Co., Ltd., Shenzhen, Guangdong (CN)

(72) Inventors: Yi Wang, Shanghai (CN); Lei Huang, Shanghai (CN); Ganghua Yang, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/180,267

(22) Filed: Jun. 13, 2016

(65) Prior Publication Data
US 2016/0286512 A1 Sep. 29, 2016

Related U.S. Application Data

(63) Continuation of application No. PCT/CN2013/089268, filed on Dec. 12, 2013.

(51) Int. Cl.
*H04W 56/00* (2009.01)

(52) U.S. Cl.
CPC ..... *H04W 56/0015* (2013.01); *H04W 56/001* (2013.01)

(58) Field of Classification Search
CPC .................. H04W 56/0015; H04W 56/001
USPC ......... 455/502, 422.1, 515, 434, 446, 452.1, 455/66.1
See application file for complete search history.

(56) References Cited

U.S. PATENT DOCUMENTS

| 6,005,854 A | 12/1999 | Xu et al. |
| 8,891,592 B1 * | 11/2014 | Zhang .................. H04B 1/7073 375/145 |
| 9,312,940 B2 * | 4/2016 | Takano ............... H04B 7/0865 |

(Continued)

FOREIGN PATENT DOCUMENTS

| CN | 1270722 A | 10/2000 |
| CN | 101137221 A | 3/2008 |
| CN | 102783061 A | 11/2012 |

OTHER PUBLICATIONS

Zhouyue Pi et al., "An Introduction to Millimeter-Wave Mobile Broadband Systems", IEEE Communications Magazine, Jun. 2011, p. 101-107.

*Primary Examiner* — John J Lee

(57) ABSTRACT

The present invention provides a synchronization method of user equipment and user equipment, where the method includes: when the user equipment accesses a millimeter-wave band network, performing first synchronization in a cellular band by using a cellular band network that covers the millimeter-wave band network; and performing second synchronization in a millimeter-wave band by using the millimeter-wave band network. In the present invention, after the first synchronization in the cellular band is performed, the second synchronization in the millimeter-wave band is performed by using the millimeter-wave band network, which avoids a case in which the user equipment acquires a PSS in a PSS synchronization window that slides in the millimeter-wave band for a long time, thereby reducing overheads, narrowing a range of the synchronization window, and accelerating detection of a PSS in the millimeter-wave band, so that the user equipment quickly and accurately performs synchronization in the millimeter-wave band.

17 Claims, 4 Drawing Sheets

S401
When user equipment accesses a millimeter-wave band network, perform first synchronization in a cellular band by using a cellular band network that covers the millimeter-wave band network S402
Perform second synchronization in a millimeter-wave band by using the millimeter-wave band network

(56) References Cited

U.S. PATENT DOCUMENTS

| | | |
|---|---|---|
| 2011/0182174 A1 | 7/2011 | Pi et al. |
| 2011/0305236 A1* | 12/2011 | Morioka ........... H04W 74/0808 370/345 |
| 2012/0028588 A1* | 2/2012 | Morioka .............. H04B 7/0617 455/71 |
| 2012/0243638 A1 | 9/2012 | Maltsev et al. |
| 2012/0320833 A1 | 12/2012 | Yamamoto et al. |

* cited by examiner

SYNCHRONIZATION METHOD OF USER EQUIPMENT AND USER EQUIPMENT

CROSS-REFERENCE TO RELATED APPLICATIONS

This application is a continuation of International Application No. PCT/CN2013/089268, filed on Dec. 12, 2013, which is hereby incorporated by reference in its entirety.

TECHNICAL FIELD

The present invention pertains to the field of mobile communications technologies, and in particular, to a synchronization method of user equipment and user equipment.

BACKGROUND

As one of the most successful technical innovations in history, mobile communication develops extremely rapidly. With gradual increase of mobile users, mobile applications, and mobile services, a requirement of large-capacity, low-delay, and more reliable mobile communication also gradually increases. In recent years, the foregoing requirement is partly met by using more advanced communications technologies, allocating more spectrums, and deploying denser base stations. However, mobile data services are to present an explosive growth trend in the next decade according to a forecast, which poses a more severe challenge to design of a next generation mobile communications network. Currently, most of low-band spectrum resources (for example, bands below 3 GHz) that are applicable to mobile communication are already allocated. However, a large quantity of spectrum resources in a band between 3 GHz and 300 GHz are still not allocated or used. According to a definition from ITU, a band between 3 GHz and 30 GHz is referred to as a super high frequency (SHF) band, and a band between 30 GHz and 300 GHz is referred to as an extremely high frequency (EHF) band. The SHF band and the EHF band have a similar propagation characteristic (a relatively large propagation loss) and a wavelength range between 1 millimeter and 100 millimeters, and therefore a band between 3 GHz and 300 GHz is collectively referred to as a millimeter-wave band.

However, research on using the millimeter-wave band in cellular mobile communication is still in an initial stage, and a technology is still not mature. When accessing a millimeter-wave band network, user equipment needs to acquire a PSS in a PSS (English: Primary Synchronization Signal) synchronization window that slides in the millimeter-wave band for a long time, and synchronization in the millimeter-wave band cannot be accelerated. For example, as shown in FIG. 1, in an actual transmission process, when a user receives a cellular band frame and a millimeter-wave band frame, a delay is to be generated between start locations of the cellular band frame and the millimeter-wave band frame. The delay is caused by various factors, for example, a transmit delay difference in a cellular band and the millimeter-wave band on a base station side, a delay difference caused by a millimeter-wave band RF (English: Radio Frequency) channel device and a cellular band RF channel device, and a delay difference caused by different space propagation paths of different band signals.

SUMMARY

An objective of embodiments of the present invention is to provide a synchronization method of user equipment and user equipment, which resolves a problem that synchronization in a millimeter-wave band cannot be accelerated when the user equipment accesses a millimeter-wave band network.

With reference to a first aspect, user equipment is provided, including:

a first synchronization unit, configured to: when the user equipment accesses a millimeter-wave band network, perform first synchronization in a cellular band by using a cellular band network that covers the millimeter-wave band network; and a second synchronization unit, configured to perform second synchronization in a millimeter-wave band by using the millimeter-wave band network.

With reference to the first aspect, in a first possible implementation manner of the first aspect, the first synchronization unit is further configured to perform the first synchronization in the cellular band by acquiring a synchronization window in which a primary synchronization signal PSS of the cellular band network that covers the millimeter-wave band network is located.

With reference to the first possible implementation manner of the first aspect, in a second possible implementation manner of the first aspect, the user equipment further includes:

a first receiving unit, configured to receive a synchronization signal that is of the cellular band network and that is transmitted by a cellular band radio frequency RF transceiver in a base station, where the cellular band RF transceiver is an RF transceiver configured to receive and send data of the cellular band network that covers the millimeter-wave band network.

With reference to the second possible implementation manner of the first aspect, in a third possible implementation manner of the first aspect, the first synchronization unit is further configured to perform incoherent detection on a received synchronization signal of the cellular band network, acquire the synchronization window in which the primary synchronization signal PSS of the cellular band network that covers the millimeter-wave band network is located, and perform the first synchronization in the cellular band.

With reference to the second possible implementation manner of the first aspect, in a fourth possible implementation manner of the first aspect, the first synchronization unit is further configured to perform, in a fixed period according to a prestored first PSS sequence, time-domain correlation on a sequence in a sliding PSS synchronization window of the cellular band network that covers the millimeter-wave band network; and configured to acquire a synchronization window of highest correlation in the time-domain correlation, where the synchronization window of the highest correlation is the synchronization window in which the primary synchronization signal PSS of the cellular band network that covers the millimeter-wave band network is located.

With reference to the first aspect, in a fifth possible implementation manner of the first aspect, the user equipment further includes:

a second receiving unit, configured to receive a synchronization signal that is of the millimeter-wave band network and that is sent by a millimeter-wave band network RF transceiver in a base station, where the millimeter-wave band network RF transceiver is an RF transceiver configured to receive and send data of the millimeter wave.

With reference to the first aspect, the first possible implementation manner of the first aspect, or the third possible implementation manner of the first aspect, in a sixth possible implementation manner of the first aspect, the second synchronization unit is specifically configured to: after a $t_0+t_1$ time of the acquired synchronization window in which the PSS of the cellular band network is located, perform incoherent detection on the received synchronization signal of the millimeter-wave band network, acquire a synchronization window in which a PSS of the millimeter-wave band network is located, and perform the second synchronization in the millimeter-wave band, where $t_0$ is an acquired start location delay between a cellular band subframe and a millimeter-wave band subframe, and $t_1$ is a predefined time difference between a PSS in the cellular band and a PSS in the millimeter-wave band that is closest to the PSS in the cellular band.

With reference to the sixth possible implementation manner of the first aspect, in a seventh possible implementation manner of the first aspect, the second synchronization unit is further configured to perform, in a fixed period according to a prestored second PSS sequence, time-domain correlation on a sequence in a sliding PSS synchronization window of the millimeter-wave band network; and configured to acquire a synchronization window of highest correlation in the time-domain correlation, where the synchronization window of the highest correlation is the synchronization window in which the PSS of the millimeter-wave band network is located.

With reference to the sixth possible implementation manner of the first aspect, in an eighth possible implementation manner of the first aspect, the user equipment further includes:

an acquiring unit, configured to obtain the start location delay between the cellular band subframe and the millimeter-wave band subframe by acquiring radio resource control RRC signaling or system broadcast information of the cellular band.

According to a second aspect, user equipment is provided, where the user equipment includes a processor, a memory, and a communications interface, where the processor, the communications interface, and the memory communicate with each other by using a bus;

the communications interface is configured to communicate with another communications device;

the processor is configured to execute a program; and the memory is configured to store the program, where the program is used to: when the user equipment accesses a millimeter-wave band network, perform first synchronization in a cellular band by using a cellular band network that covers the millimeter-wave band network; and used to perform second synchronization in a millimeter-wave band by using the millimeter-wave band network.

According to a third aspect, a synchronization method of user equipment is provided, where the method includes:

when the user equipment accesses a millimeter-wave band network, performing first synchronization in a cellular band by using a cellular band network that covers the millimeter-wave band network; and performing second synchronization in a millimeter-wave band by using the millimeter-wave band network.

With reference to the third aspect, in a first possible implementation manner of the third aspect, the performing first synchronization in a cellular band by using a cellular band network that covers the millimeter-wave band network includes:

performing the first synchronization in the cellular band by acquiring a synchronization window in which a primary synchronization signal PSS of the cellular band network that covers the millimeter-wave band network is located.

With reference to the first possible implementation manner of the third aspect, in a second possible implementation manner of the third aspect, before the acquiring a synchronization window in which a primary synchronization signal PSS of a control information network that covers the millimeter-wave band network is located, the method includes:

receiving a synchronization signal that is of the cellular band network and that is sent by a cellular band RF transceiver in a base station, where the cellular band RF transceiver is an RF transceiver configured to receive and send data of the cellular band network that covers the millimeter-wave band network.

With reference to the second possible implementation manner of the third aspect, in a third possible implementation manner of the third aspect, the method further includes:

performing incoherent detection on a received synchronization signal of the cellular band network, acquiring the synchronization window in which the primary synchronization signal PSS of the cellular band network that covers the millimeter-wave band network is located, and performing the first synchronization in the cellular band.

With reference to the second possible implementation manner of the third aspect, in a fourth possible implementation manner of the third aspect, the performing incoherent detection on a received synchronization signal of the cellular band network, and acquiring the synchronization window in which the primary synchronization signal PSS of the cellular band network that covers the millimeter-wave band network is located further includes:

performing, in a fixed period according to a prestored first PSS sequence, time-domain correlation on a sequence in a sliding PSS synchronization window of the cellular band network that covers the millimeter-wave band network; and acquiring a synchronization window of highest correlation in the time-domain correlation, where the synchronization window of the highest correlation is the synchronization window in which the primary synchronization signal PSS of the cellular band network that covers the millimeter-wave band network is located.

With reference to the third aspect, in a fifth possible implementation manner of the third aspect, before the performing second synchronization in a millimeter-wave band by using the millimeter-wave band network, the method includes:

receiving a synchronization signal that is of the millimeter-wave band network and that is sent by a millimeter-wave band network RF transceiver in a base station, where the millimeter-wave band network RF transceiver is an RF transceiver configured to receive and send data of the millimeter wave.

With reference to the third aspect, the first possible implementation manner of the third aspect, or the third possible implementation manner of the third aspect, in a sixth possible implementation manner of the third aspect, after the performing first synchronization in a cellular band, the performing second synchronization in a millimeter-wave band by using the millimeter-wave band network includes:

after a $t_0+t_1$ time of the acquired synchronization window in which the PSS of the cellular band network is located, performing incoherent detection on the received synchronization signal of the millimeter-wave band network, acquiring a synchronization window in which a PSS of the millimeter-wave band network is located, and performing the second synchronization in the millimeter-wave band, where $t_0$ is an acquired start location delay between a cellular band subframe and a millimeter-wave band subframe, and $t_1$ is a predefined time difference between a PSS in the cellular band and a PSS in the millimeter-wave band that is closest to the PSS in the cellular band.

With reference to the sixth possible implementation manner of the third aspect, in a seventh possible implementation manner of the third aspect, the performing incoherent detection on the received synchronization signal of the millimeter-wave band network, and acquiring a synchronization window in which a PSS of the millimeter-wave band network is located includes:

performing, in a fixed period according to a prestored second PSS sequence, time-domain correlation on a sequence in a sliding PSS synchronization window of the millimeter-wave band network; and acquiring a synchronization window of highest correlation in the time-domain correlation, where the synchronization window of the highest correlation is the synchronization window in which the PSS of the millimeter-wave band network is located.

With reference to the sixth possible implementation manner of the third aspect, in an eighth possible implementation manner of the third aspect, the method further includes:

obtaining the start location delay between the cellular band subframe and the millimeter-wave band subframe by acquiring radio resource control RRC signaling or system broadcast information of the cellular band.

In the embodiments of the present invention, after first synchronization in a cellular band is performed, second synchronization in a millimeter-wave band is performed by using a millimeter-wave band network, which avoids a case in which user equipment acquires a PSS in a PSS synchronization window that slides in the millimeter-wave band for a long time, thereby reducing overheads, narrowing a range of the synchronization window, and accelerating detection of a PSS in the millimeter-wave band, so that the user equipment quickly and accurately performs synchronization in the millimeter-wave band.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
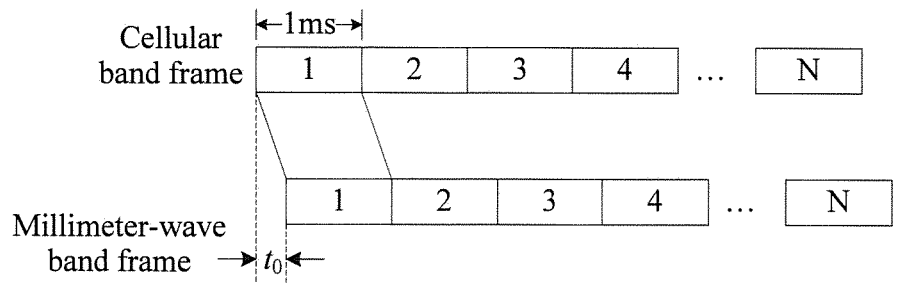
FIG. 1 is a schematic diagram of a delay between a cellular band frame and a millimeter-wave band frame according to the prior art.
Figure 2:
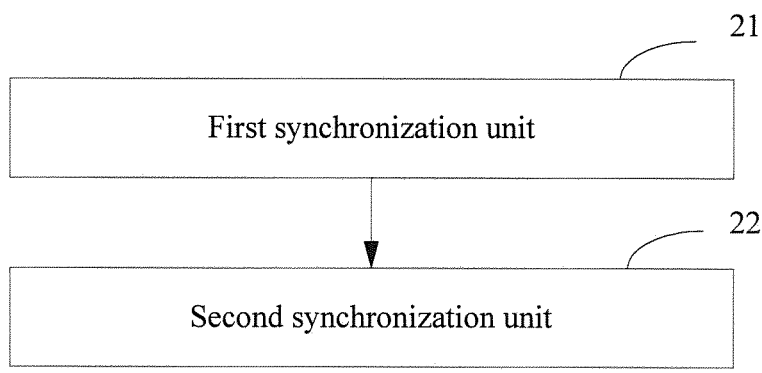
FIG. 2 shows user equipment according to an embodiment of the present invention.

Referring to FIG. 2, FIG. 2 shows user equipment according to an embodiment of the present invention. For ease of description, only parts related to this embodiment are shown, which are described in detail as follows:

a first synchronization unit 21, configured to: when the user equipment accesses a millimeter-wave band network, perform first synchronization in a cellular band by using a cellular band network that covers the millimeter-wave band network; and a second synchronization unit 22, configured to perform second synchronization in a millimeter-wave band by using the millimeter-wave band network.

Further, the first synchronization unit is further configured to perform the first synchronization in the cellular band by acquiring a synchronization window in which a primary synchronization signal PSS of the cellular band network that covers the millimeter-wave band network is located.

Further, the user equipment further includes:

a first receiving unit, configured to receive a synchronization signal that is of the cellular band network and that is transmitted by a cellular band radio frequency RF transceiver in a base station, where the cellular band RF transceiver is an RF transceiver configured to receive and send data of the cellular band network that covers the millimeter-wave band network.

The first receiving unit may be a cellular band receiving device, for example, a cellular band receiver.

Further, the first synchronization unit is further configured to perform incoherent detection on a received synchronization signal of the cellular band network, acquire the synchronization window in which the primary synchronization signal PSS of the cellular band network that covers the millimeter-wave band network is located, and perform the first synchronization in the cellular band.

Further, the first synchronization unit is further configured to perform, in a fixed period according to a prestored first PSS sequence, time-domain correlation on a sequence in a sliding PSS synchronization window of the cellular band network that covers the millimeter-wave band network; and configured to acquire a synchronization window of highest correlation in the time-domain correlation, where the synchronization window of the highest correlation is the synchronization window in which the primary synchronization signal PSS of the cellular band network that covers the millimeter-wave band network is located.

Further, the user equipment further includes:

a second receiving unit, configured to receive a synchronization signal that is of the millimeter-wave band network and that is sent by a millimeter-wave band network RF transceiver in a base station, where the millimeter-wave band network RF transceiver is an RF transceiver configured to receive and send data of the millimeter wave.

The second receiving unit may be a millimeter-wave band receiving device, for example, a cellular band receiver.

Further, the second synchronization unit is specifically configured to: after a $t_0+t_1$ time of the acquired synchronization window in which the PSS of the cellular band network is located, perform incoherent detection on the received synchronization signal of the millimeter-wave band network, acquire a synchronization window in which a PSS of the millimeter-wave band network is located, and perform the second synchronization in the millimeter-wave band, where $t_0$ is an acquired start location delay between a cellular band subframe and a millimeter-wave band subframe, and $t_1$ is a predefined time difference between a PSS in the cellular band and a PSS in the millimeter-wave band that is closest to the PSS in the cellular band.

Further, the second synchronization unit is further configured to perform, in a fixed period according to a prestored second PSS sequence, time-domain correlation on a sequence in a sliding PSS synchronization window of the millimeter-wave band network; and configured to acquire a synchronization window of highest correlation in the time-domain correlation, where the synchronization window of the highest correlation is the synchronization window in which the PSS of the millimeter-wave band network is located.

Further, the user equipment further includes:

an acquiring unit, configured to obtain the start location delay between the cellular band subframe and the millimeter-wave band subframe by acquiring radio resource control RRC signaling or system broadcast information of the cellular band.

Figure 3:
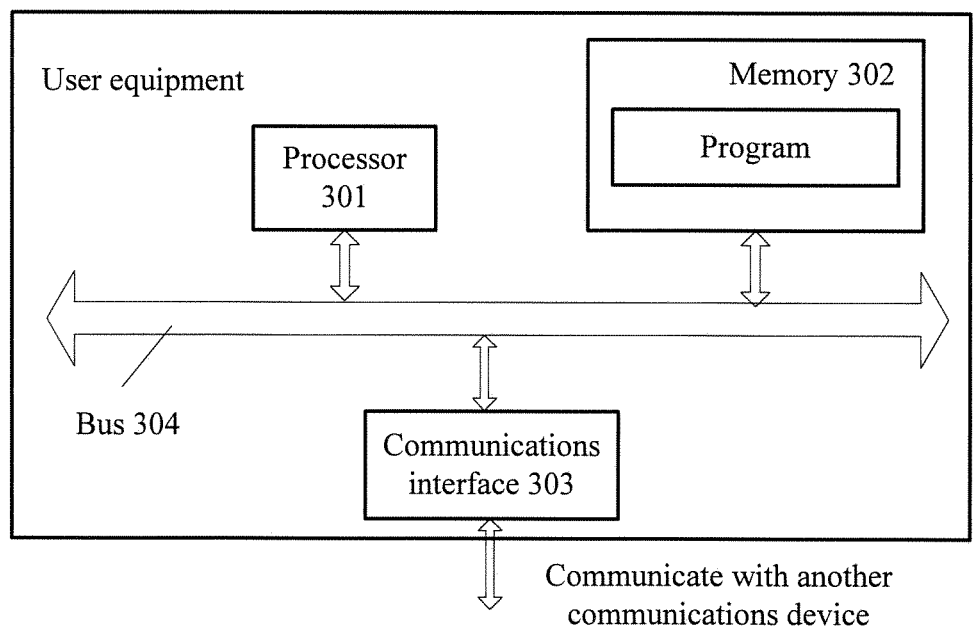
FIG. 3 is a schematic structural diagram of user equipment according to an embodiment of the present invention.

Referring to FIG. 3, FIG. 3 is a schematic structural diagram of user equipment according to an embodiment of the present invention, and a specific embodiment of the present invention sets no limitation on specific implementation of the user equipment. The user equipment 100 includes:

a processor 301, a communications interface 302, a memory 303, and a bus 304.

The processor 301, the communications interface 302, and the memory 303 communicate with each other by using the bus 304.

The communications interface 302 is configured to communicate with another communications device.

The processor 301 is configured to execute a program.

Specifically, the program may include program code, where the program code includes a computer operation instruction.

The processor 301 may be a central processing unit (CPU for short).

The memory 303 is configured to store the program, where the program is used to: when the user equipment accesses a millimeter-wave band network, perform first synchronization in a cellular band by using a cellular band network that covers the millimeter-wave band network; and perform second synchronization in a millimeter-wave band by using the millimeter-wave band network.

Figure 4:
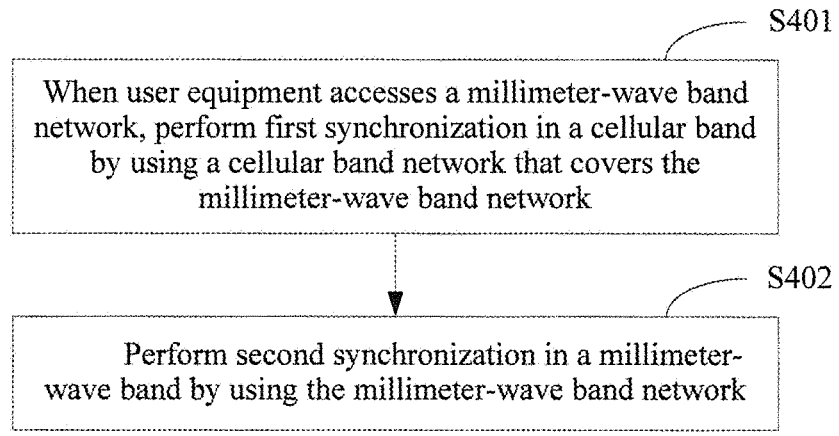
FIG. 4 is a flowchart of implementing a synchronization method of user equipment according to an embodiment of the present invention.

Referring to FIG. 4, FIG. 4 is a flowchart of implementing a synchronization method of user equipment according to an embodiment of the present invention, which is described in detail as follows:

In step S401, when the user equipment accesses a millimeter-wave band network, first synchronization in a cellular band is performed by using a cellular band network that covers the millimeter-wave band network.

The cellular band network that covers the millimeter-wave band network indicates that a coverage area of the millimeter-wave band network is within an area of the cellular band network.

In a configuration manner in which a traditional cellular base station and a millimeter-wave base station use a co-site manner, a cellular band RF transceiver in the traditional cellular base station uses an omnidirectional or wide-beam antenna configuration, which is used to form network coverage of the cellular band network that covers the millimeter-wave band network, so that the user equipment that is located within a coverage area of the millimeter-wave base station is also located within a coverage area of the co-site traditional cellular base station.

In this embodiment, the user equipment may receive a synchronization signal that is in a communication process and that is transmitted by the cellular band RF transceiver in the base station, and may perform the first synchronization in the cellular band by using the cellular band network that covers the millimeter-wave band network.

In step S402, second synchronization in a millimeter-wave band is performed by using the millimeter-wave band network.

After the first synchronization in the cellular band is performed, the second synchronization in the millimeter-wave band is performed by using the millimeter-wave band network. A process of the second synchronization is described in a subsequent embodiment, and details are not described herein again.

In the present invention, after first synchronization in a cellular band is performed, second synchronization in a millimeter-wave band is performed by using a millimeter-wave band network, which avoids a case in which user equipment acquires a PSS in a PSS synchronization window that slides in the millimeter-wave band for a long time, thereby reducing overheads, narrowing a range of the synchronization window, and accelerating detection of a PSS in the millimeter-wave band, so that the user equipment quickly and accurately performs synchronization in the millimeter-wave band.

As a preferred embodiment of the present invention, that first synchronization in a cellular band is performed by using a cellular band network that covers the millimeter-wave band network includes:

performing the first synchronization in the cellular band by acquiring a synchronization window in which a primary synchronization signal PSS of the cellular band network that covers the millimeter-wave band network is located.

In this embodiment, when the user equipment accesses the millimeter-wave band network, the first synchronization in the cellular band is performed, that is, the synchronization window in which the primary synchronization signal PSS of the cellular band network that covers the millimeter-wave band network is located is acquired.

As a preferred embodiment of the present invention, before that first synchronization in a cellular band is performed by using a cellular band network that covers the millimeter-wave band network, the method includes:

receiving a synchronization signal that is of the cellular band network and that is sent by a cellular band RF transceiver in a base station, where the cellular band RF transceiver is an RF transceiver configured to receive and send data of the cellular band network that covers the millimeter-wave band network.

In this embodiment, the user equipment receives, through a synchronization channel of the cellular band network, a synchronization signal sent by the base station in the synchronization channel, so as to subsequently perform incoherent detection on a received synchronization signal of the cellular band network.

Figure 7:
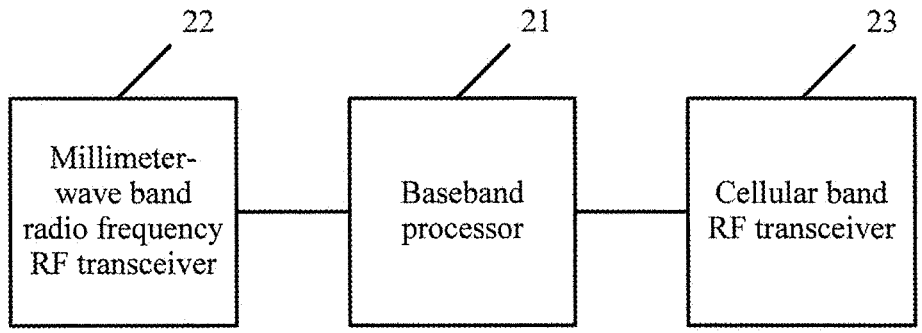
FIG. 7 is a structural diagram of a base station according to an embodiment of the present invention.
Figure 8:
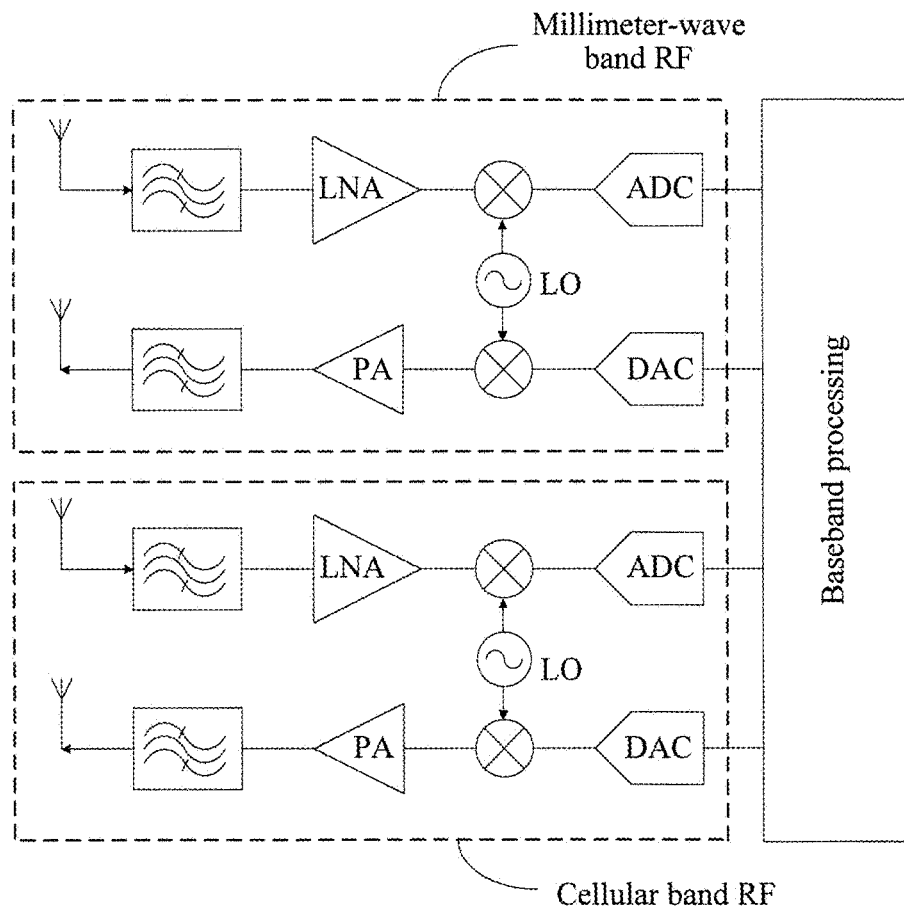
FIG. 8 is an exemplary schematic diagram in which a baseband processor is separately connected to a millimeter-wave band RF transceiver and a cellular band RF transceiver according to an embodiment of the present invention.
Figure 9:
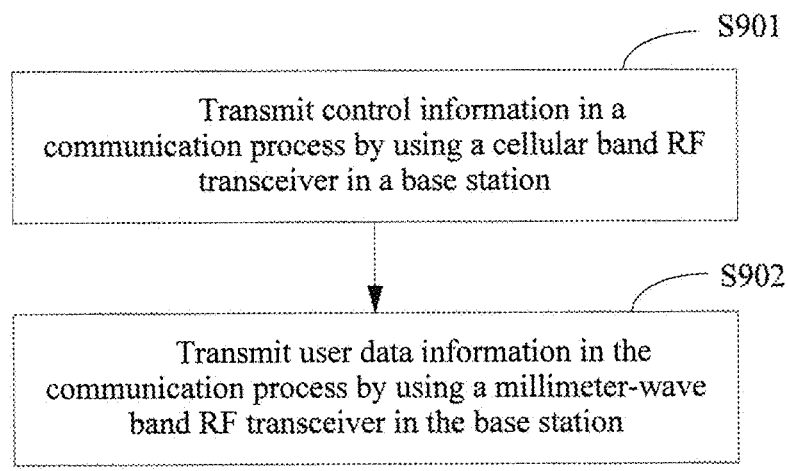
FIG. 9 is a flowchart of implementing a data transmission method of a base station according to an embodiment of the present invention.

It should be noted that for detailed description of the cellular band RF transceiver in this embodiment, reference may be made to description of the cellular band RF transceiver in subsequent embodiments in FIG. 7, FIG. 8, and FIG. 9.

As a preferred embodiment of the present invention, incoherent detection is performed on a received synchronization signal of the cellular band network, the synchronization window in which the primary synchronization signal PSS of the cellular band network that covers the millimeter-wave band network is located is acquired, and the first synchronization in the cellular band is performed.

As a preferred embodiment of the present invention, that incoherent detection is performed on a received synchronization signal of the cellular band network, and the synchronization window in which the primary synchronization signal PSS of the cellular band network that covers the millimeter-wave band network is located is acquired includes:

performing, in a fixed period according to a prestored first PSS sequence, time-domain correlation on a sequence in a sliding PSS synchronization window of the cellular band network that covers the millimeter-wave band network; and acquiring a synchronization window of highest correlation in the time-domain correlation, where the synchronization window of the highest correlation is the synchronization window in which the primary synchronization signal PSS of the cellular band network that covers the millimeter-wave band network is located.

The first PSS sequence is a PSS sequence of the cellular band network.

In this embodiment, for ease of description, that a synchronization operation in the cellular band uses a two-layer synchronization structure defined in the LTE is used as an example, where timeslot synchronization is implemented by performing incoherent detection on the PSS in the cellular band, and frame synchronization is implemented by performing coherent detection on a secondary synchronization signal. Because incoherent detection is performed on the PSS, that is, time-domain correlation is performed, in a fixed period, on a sequence in a sliding PSS synchronization window by using a known PSS sequence, the synchronization window of the highest correlation is the synchronization window in which the primary synchronization signal PSS of the cellular band network that covers the millimeter-wave band network is located, so that the user equipment subsequently detects the PSS in the millimeter-wave band after a $t_0+t_1$ time after a start time of the synchronization window in which the PSS of the cellular band is located.

A synchronization signal that is of the millimeter-wave band network and that is sent by a millimeter-wave band network RF transceiver in a base station is received, where the millimeter-wave band network RF transceiver is an RF transceiver configured to receive and send data of the millimeter wave.

In this embodiment, the user equipment receives, through a synchronization channel of the millimeter-wave band network, a synchronization signal sent by the base station in the synchronization channel, so as to subsequently perform incoherent detection on a received synchronization signal of the millimeter-wave band network.

It should be noted that for detailed description of the millimeter-wave band network RF transceiver in this embodiment, reference may be made to description of the millimeter-wave band network RF transceiver in subsequent embodiments in FIG. 7, FIG. 8, and FIG. 9.

As a preferred embodiment of the present invention, before that second synchronization in a millimeter-wave band is performed by using the millimeter-wave band network, the method includes:

receiving a synchronization signal that is of the millimeter-wave band network and that is sent by a millimeter-wave band network RF transceiver in a base station, where the millimeter-wave band network RF transceiver is an RF transceiver configured to receive and send data of the millimeter wave.

As a preferred embodiment of the present invention, that second synchronization in a millimeter-wave band is performed by using the millimeter-wave band network includes:

after a $t_0+t_1$ time of the acquired synchronization window in which the PSS of the cellular band network is located, performing incoherent detection on the received synchronization signal of the millimeter-wave band network, acquiring a synchronization window in which a PSS of the millimeter-wave band network is located, and performing the second synchronization in the millimeter-wave band, where $t_0$ is an acquired start location delay between a cellular band subframe and a millimeter-wave band subframe, and $t_1$ is a predefined time difference between a PSS in the cellular band and a PSS in the millimeter-wave band that is closest to the PSS in the cellular band.

In this embodiment, $t_0$ is the acquired start location delay between the cellular band subframe and the millimeter-wave band subframe.

In this embodiment, $t_1$ is the predefined time difference between a PSS in the cellular band and a PSS in the millimeter-wave band that is closest to the PSS in the cellular band, and $t_1$ is a fixed value.

As a preferred embodiment of the present invention, that incoherent detection is performed on the received synchronization signal of the millimeter-wave band network, and a synchronization window in which a PSS of the millimeter-wave band network is located is acquired includes:

performing, in a fixed period according to a prestored second PSS sequence, time-domain correlation on a sequence in a sliding PSS synchronization window of the millimeter-wave band network; and acquiring a synchronization window of highest correlation in the time-domain correlation, where the synchronization window of the highest correlation is the synchronization window in which the PSS of the millimeter-wave band network is located.

The second PSS sequence is a PSS sequence of the millimeter-wave band network.

Figure 5:
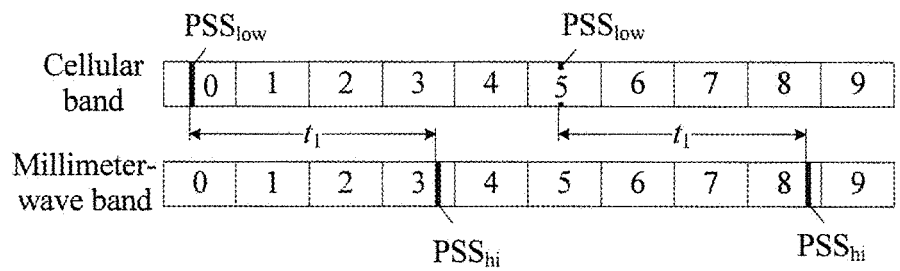
FIG. 5 is an exemplary schematic diagram of actual locations at which a PSS in a cellular band and a PSS in a millimeter-wave band are located according to an embodiment of the present invention.

Referring to FIG. 5, FIG. 5 is an exemplary schematic diagram of actual locations at which a PSS in a cellular band and a PSS in a millimeter-wave band are located according to an embodiment of the present invention. A PSS defined by LTE-FDD in the cellular band is located on the sixth OFDM symbol of a subframe 0 and the sixth OFDM symbol of a subframe 5, and a PSS in the millimeter-wave band is located on the $x^{th}$ OFDMA symbol of a subframe 3 and the $x^{th}$ OFDMA symbol of a subframe 8, where x is determined according to a specific system design. A time difference between a PSS in the cellular band and a PSS in the millimeter-wave band that is closest to the PSS in the cellular band is defined as $t_1$.

For example, when the PSS in the millimeter-wave band is located on the eighth OFDMA symbol of the subframe 3 and the eighth OFDMA symbol of the subframe 8, and the PSS in the cellular band is located on the sixth OFDM symbol of the subframe 0 and the sixth OFDM symbol of the subframe 5, a time difference between the sixth OFDM symbol of the subframe 0 in the cellular band and the eighth OFDMA symbol of the subframe 3 in the millimeter-wave band is the time difference $t_1$ between the PSS in the cellular band and the PSS in the millimeter-wave band that is closest to the PSS in the cellular band, and a time difference between the sixth OFDM symbol of the subframe 5 in the cellular band and the eighth OFDMA symbol of the subframe 8 in the millimeter-wave band is the time difference $t_1$ between the PSS in the cellular band and the PSS in the millimeter-wave band that is closest to the PSS in the cellular band.

In this embodiment, second synchronization in a millimeter-wave band is performed by using a millimeter-wave band network, that is, a synchronization window in which a primary synchronization signal PSS of the millimeter-wave band network is located is acquired.

Figure 6:
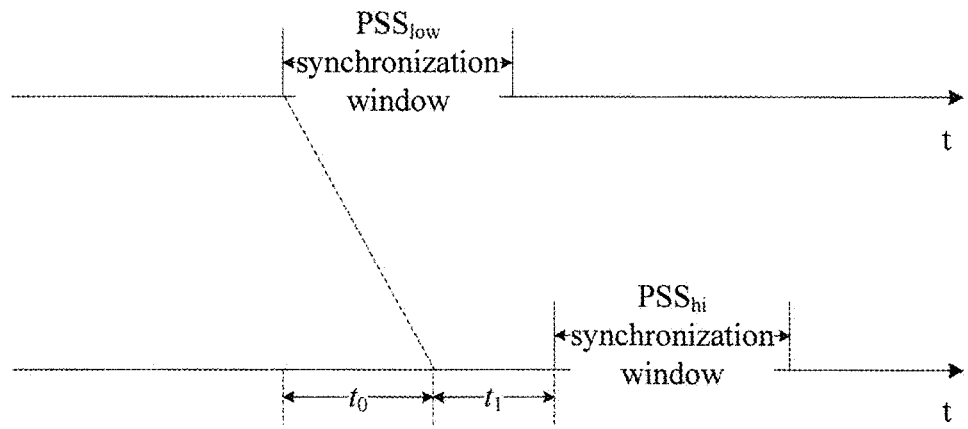
FIG. 6 is an exemplary schematic diagram of a relative delay between a synchronization window in a cellular band and a synchronization window in a millimeter-wave band according to an embodiment of the present invention.

Referring to FIG. 6, FIG. 6 is an exemplary schematic diagram of a relative delay between a synchronization window in a cellular band and a synchronization window in a millimeter-wave band according to an embodiment of the present invention.

A $PSS_{low}$ synchronization window indicates the synchronization window in the cellular band, and a $PSS_{hi}$ synchronization window indicates the synchronization window in the millimeter-wave band. After a $t_0+t_1$ time of the $PSS_{low}$ synchronization window in which a communications network in the cellular band is accessed, a PSS in the millimeter-wave band is detected in the $PSS_{hi}$ synchronization window. A detection manner includes but is not limited to an incoherent detection manner.

In this embodiment, after a t $t_0+t_1$ time of a synchronization window in which a PSS of a cellular band network is located, the PSS in the millimeter-wave band is detected in a sliding PSS synchronization window of the millimeter-wave band, so that each time user equipment acquires a PSS in the sliding PSS synchronization window of the millimeter-wave band, a time period of the sliding PSS synchronization window decreases by $t_0+t_1$, which avoids a case in which the user equipment acquires a PSS in a PSS synchronization window that slides in the millimeter-wave band for a long time, thereby reducing overheads, narrowing a range of the synchronization window, and accelerating detection of a PSS in the millimeter-wave band, so that the user equipment quickly and accurately performs synchronization in the millimeter-wave band.

As a preferred embodiment of the present invention, a start location delay $t_0$ between a cellular band subframe and a millimeter-wave band subframe may be obtained by acquiring radio resource control RRC signaling or system broadcast information of the cellular band.

Before a $t_0+t_1$ time of an acquired synchronization window in which a PSS for accessing the communications network in the cellular band is located, the user equipment obtains higher layer signaling (the RRC signaling or the system broadcast information) of the cellular band by using a base station, and acquires the start location delay $t_0$ between the cellular band frame and the millimeter-wave band frame in real time by using delay information carried in the higher layer signaling.

Optionally, a value may also be fixed in standardization and be used as the start location delay between the cellular band frame and the millimeter-wave band frame.

Referring to FIG. 7, FIG. 7 is a structural diagram of a base station according to an embodiment of the present invention. For ease of description, only parts related to this embodiment are shown.

The base station includes at least a baseband processor 71, a millimeter-wave band radio frequency RF transceiver 72, and a cellular band RF transceiver 73. The baseband processor 71 is separately connected to the millimeter-wave band RF transceiver 72 and the cellular band RF transceiver 73. The baseband processor is configured to process data that is received and sent by the millimeter-wave band RF transceiver 72 and that is of a millimeter-wave band network, and process data that is received and sent by the cellular band RF transceiver 73 and that is of a cellular band network that covers the millimeter-wave band network.

Further, in the base station, the millimeter-wave band radio frequency RF transceiver includes antennas configured to receive and send data in a millimeter-wave band, filters, a low noise amplifier LNA, a power amplifier PA, a local oscillator LO, mixers, an analog to digital converter ADC, and a digital to analog converter DAC.

The antenna that receives the data is connected to a filter, the filter is connected to the low noise amplifier, the low noise amplifier is connected to the mixer, and the mixer is connected to the analog to digital converter.

The antenna that sends the data is connected to a filter, the filter is connected to the power amplifier, the power amplifier is connected to the mixer, and the mixer is connected to the digital to analog converter.

The local oscillator LO is separately connected to the mixer connected to the low noise amplifier and the mixer connected to the power amplifier.

Further, in the base station, the cellular band RF transceiver includes antennas configured to receive and send data in a cellular band, filters, a low noise amplifier LNA, a power amplifier PA, a local oscillator LO, mixers, an analog to digital converter ADC, and a digital to analog converter DAC.

The antenna that receives the data is connected to a filter, the filter is connected to the low noise amplifier, the low noise amplifier is connected to the mixer, and the mixer is connected to the analog to digital converter.

The antenna that sends the data is connected to the power amplifier, the filter is connected to the power amplifier, the power amplifier is connected to the mixer, and the mixer is connected to the digital to analog converter.

The local oscillator LO is separately connected to the mixer connected to the low noise amplifier and the mixer connected to the power amplifier.

In this embodiment, the baseband processor is separately connected to the millimeter-wave band RF and the cellular band RF. Therefore, a configuration manner in which a traditional cellular base station and a millimeter-wave base station use a co-site manner is formed. In the configuration, the traditional cellular base station and the millimeter-wave base station may share one site (for example, a launch tower or a pole), and are equipped with an antenna separately, or even share one set of antenna system.

In this embodiment, an existing problem of practical base station design of a traditional cellular base station and a millimeter-wave base station, and a problem that synchronization in a millimeter-wave band cannot be accelerated when user equipment accesses a millimeter-wave band network are resolved, which implements the practical base station design of the traditional cellular base station and the millimeter-wave base station, so that the synchronization in the millimeter-wave band may be accelerated when the user equipment accesses the millimeter-wave band network.

Referring to FIG. 8, FIG. 8 is an exemplary schematic diagram in which a baseband processor is separately connected to a millimeter-wave band RF transceiver and a cellular band RF transceiver according to an embodiment of the present invention.

In the network architecture, user equipment located within a coverage area of a millimeter-wave base station is also located within a coverage area of a co-site traditional cellular base station.

In addition, data exchange between the cellular base station and the millimeter-wave base station may be considered as exchange between high-speed circuits, and it is unnecessary to consider delay and capacity problems of a backhaul link between the cellular base station and the millimeter-wave base station.

It should be noted that the baseband processor may be connected to multiple millimeter-wave band RFs and multiple cellular band RFs, which is not limited herein.

As a preferred embodiment of the present invention, in the base station, the millimeter-wave band RF transceiver uses a narrow-beam and high-gain antenna configuration, which is used to form directed network coverage of a millimeter-wave band network.

The cellular band RF transceiver uses an omnidirectional or wide-beam antenna configuration, which is used to form network coverage of a cellular band network that covers the millimeter-wave band network.

In the network architecture, when the coverage area of the millimeter-wave base station is inconsistent with the coverage area of the cellular base station, the coverage area of the millimeter-wave base station is less than the coverage area of the cellular base station.

For example, the millimeter-wave base station is used as a hotspot and covers an area of a 200-meter to 500-meter radius, and the cellular base station covers a wider area of a 1-kilometer to 2-kilometer radius. In the network architecture, user equipment located within the coverage area of the millimeter-wave base station is certainly located within the coverage area of the co-site traditional cellular base station.

In this embodiment, the cellular band RF is used to send a management control message or user data to the user equipment.

The base station provided in this embodiment of the present invention may be applied to the foregoing method embodiment of a transmission method of a base station. For details, refer to description of the foregoing embodiment, and details are not described herein again.

Referring to FIG. 9, FIG. 9 is a flowchart of implementing a data transmission method of a base station according to an embodiment of the present invention, which is described in detail as follows:

In step S901, control information in a communication process is transmitted by using a cellular band RF transceiver in the base station.

In step S902, user data information in the communication process is transmitted by using a millimeter-wave band RF transceiver in the base station.

The control information includes at least one of downlink broadcast channel BCH information, physical downlink control channel PDCCH information, downlink radio resource management RRC signaling information, uplink random access channel RACH information, physical uplink control channel PUCCH, and radio resource management RRC signaling information.

A synchronization signal in the communication process is transmitted by using the millimeter-wave band RF transceiver in the base station.

The user data information includes uplink and downlink user data information.

A small quantity of reference signaling in the communication process is transmitted by using the millimeter-wave band RF transceiver in the base station, where the reference signaling includes the synchronization signal.

In this embodiment, important information is transmitted by using a cellular band, so as to improve reliability, or broadcast and multicast information is transmitted by using the cellular band, so as to enlarge a coverage area; unicast data information is transmitted by using a millimeter-wave band, so as to improve a system throughput.

In this embodiment, the millimeter-wave band RF transceiver uses narrow-beam and high-gain antenna configuration, which is used to form network coverage of a millimeter-wave band network.

The cellular band RF transceiver uses an omnidirectional or wide-beam antenna configuration, which is used to form network coverage of a cellular band network that covers the millimeter-wave band network.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A user equipment, comprising:
   a first synchronization unit, configured to:
      when the user equipment accesses a millimeter-wave band network, perform a first synchronization in a cellular band by using a cellular band network that covers the millimeter-wave band network;
   a second synchronization unit, configured to perform a second synchronization in a millimeter-wave band by using the millimeter-wave band network;
   wherein the first synchronization unit is configured to perform the first synchronization in the cellular band by acquiring a synchronization window in which a primary synchronization signal (PSS) of the cellular band network that covers the millimeter-wave band network is located.

2. The user equipment according to claim 1, wherein the user equipment further comprises:
   a first receiving unit, configured to receive a synchronization signal that is of the cellular band network and that is transmitted by a cellular band radio frequency (RF) transceiver in a base station, wherein the cellular band RF transceiver is an RF transceiver configured to receive and send data of the cellular band network that covers the millimeter-wave band network.

3. The user equipment according to claim 2, wherein the first synchronization unit is further configured to perform incoherent detection on a received synchronization signal of the cellular band network, acquire the synchronization window in which the primary synchronization signal PSS of the cellular band network that covers the millimeter-wave band network is located, and perform the first synchronization in the cellular band.

4. The user equipment according to claim 2, wherein the first synchronization unit is further configured to:
perform, in a fixed period according to a prestored first PSS sequence, time-domain correlation on a sequence in a sliding PSS synchronization window of the cellular band network that covers the millimeter-wave band network; and
acquire a synchronization window of highest correlation in the time-domain correlation, wherein the synchronization window of the highest correlation is the synchronization window in which the primary synchronization signal PSS of the cellular band network that covers the millimeter-wave band network is located.

5. The user equipment according to claim 1, wherein the user equipment further comprises:
a second receiving unit, configured to receive a synchronization signal that is of the millimeter-wave band network and that is sent by a millimeter-wave band network radio frequency (RF) transceiver in a base station, wherein the millimeter-wave band network RF transceiver is an RF transceiver configured to receive and send data of the millimeter-wave band network.

6. The user equipment according to claim 1, wherein the second synchronization unit is configured to:
after a $t_0+t_1$ time of the acquired synchronization window in which the PSS of the cellular band network is located, perform incoherent detection on the received synchronization signal of the millimeter-wave band network, acquire a synchronization window in which a PSS of the millimeter-wave band network is located, and perform the second synchronization in the millimeter-wave band, wherein $t_0$ is an acquired start location delay between a cellular band subframe and a millimeter-wave band subframe, and $t_1$ is a predefined time difference between a PSS in the cellular band and a PSS in the millimeter-wave band that is closest to the PSS in the cellular band.

7. The user equipment according to claim 6, wherein the second synchronization unit is further configured to:
perform, in a fixed period according to a prestored second PSS sequence, time-domain correlation on a sequence in a sliding PSS synchronization window of the millimeter-wave band network; and
acquire a synchronization window of highest correlation in the time-domain correlation, wherein the synchronization window of the highest correlation is the synchronization window in which the PSS of the millimeter-wave band network is located.

8. The user equipment according to claim 6, further comprising:
an acquiring unit, configured to obtain the start location delay between the cellular band subframe and the millimeter-wave band subframe by acquiring radio resource control (RRC) signaling or system broadcast information of the cellular band.

9. A user equipment, comprising:
a communications interface configured to communicate with another communications device;
a processor configured to execute a program;
a memory configured to store the program, wherein the program when executed causes the user equipment to:
when the user equipment accesses a millimeter-wave band network:
perform a first synchronization in a cellular band by using a cellular band network that covers the millimeter-wave band network and by acquiring a synchronization window in which a primary synchronization signal (PSS) of the cellular band network that covers the millimeter-wave band network is located, and
perform a second synchronization in a millimeter-wave band by using the millimeter-wave band network; and
wherein the communications interface, the processor and the memory communicate with each other by using a bus.

10. A synchronization method for use with user equipment, the method comprising:
when the user equipment accesses a millimeter-wave band network:
performing a first synchronization in a cellular band by using a cellular band network that covers the millimeter-wave band network;
performing a second synchronization in a millimeter-wave band by using the millimeter-wave band network;
wherein performing the first synchronization comprises performing the first synchronization in the cellular band by acquiring a synchronization window in which a primary synchronization signal (PSS) of the cellular band network that covers the millimeter-wave band network is located.

11. The synchronization method according to claim 10, wherein before performing the first synchronization in the cellular band by using the cellular band network that covers the millimeter-wave band network, the method comprises:
receiving a synchronization signal that is of the cellular band network and that is sent by a cellular band radio frequency (RF) transceiver in a base station, wherein the cellular band RF transceiver is an RF transceiver configured to receive and send data of the cellular band network that covers the millimeter-wave band network.

12. The synchronization method according to claim 11, further comprising:
performing incoherent detection on a received synchronization signal of the cellular band network, acquiring the synchronization window in which the PSS of the cellular band network that covers the millimeter-wave band network is located, and performing the first synchronization in the cellular band.

13. The synchronization method according to claim 12, wherein performing incoherent detection on the received synchronization signal of the cellular band network, and acquiring the synchronization window in which the PSS of the cellular band network that covers the millimeter-wave band network is located comprises:
performing, in a fixed period according to a prestored first PSS sequence, time-domain correlation on a sequence in a sliding PSS synchronization window of the cellular band network that covers the millimeter-wave band network; and
acquiring a synchronization window of highest correlation in the time-domain correlation, wherein the synchronization window of the highest correlation is the synchronization window in which the PSS of the cellular band network that covers the millimeter-wave band network is located.

14. The synchronization method according to claim 10, wherein before performing the second synchronization in the millimeter-wave band by using the millimeter-wave band network, the method comprises:
receiving a synchronization signal that is of the millimeter-wave band network and that is sent by a millimeter-wave band network radio frequency (RF) transceiver in a base station, wherein the millimeter-wave band network RF transceiver is an RF transceiver configured to receive and send data of the millimeter-wave band network.

15. The synchronization method according to claim 10, wherein after performing the first synchronization in the cellular band, performing the second synchronization in the millimeter-wave band by using the millimeter-wave band network comprises:

after a $t_0+t_0$ time of the acquired synchronization window in which the PSS of the cellular band network is located, performing incoherent detection on the received synchronization signal of the millimeter-wave band network, acquiring a synchronization window in which a PSS of the millimeter-wave band network is located, and performing the second synchronization in the millimeter-wave band, wherein $t_0$ is an acquired start location delay between a cellular band subframe and a millimeter-wave band subframe, and $t_1$ is a predefined time difference between a PSS in the cellular band and a PSS in the millimeter-wave band that is closest to the PSS in the cellular band.

16. The synchronization method according to claim 15, wherein performing incoherent detection on the received synchronization signal of the millimeter-wave band network, and acquiring the synchronization window in which the PSS of the millimeter-wave band network is located comprises:

performing, in a fixed period according to a prestored second PSS sequence, time-domain correlation on a sequence in a sliding PSS synchronization window of the millimeter-wave band network; and acquiring a synchronization window of highest correlation in the time-domain correlation, wherein the synchronization window of the highest correlation is the synchronization window in which the PSS of the millimeter-wave band network is located.

17. The synchronization method according to claim 15, further comprising:

obtaining the start location delay between the cellular band subframe and the millimeter-wave band subframe by acquiring radio resource control (RRC) signaling or system broadcast information of the cellular band.

* * * * *